US012791003B1

(12) United States Patent
Khaja Muhieitheen et al.

(10) Patent No.: US 12,791,003 B1
(45) Date of Patent: Nov. 10, 2026

(54) MECHANICAL MOTION RECTIFIERS FOR USE WITH POWER TAKE-OFF SYSTEMS

(71) Applicant: King Fahd University of Petroleum and Minerals, Dhahran (SA)

(72) Inventors: Mahmood Khaja Muhieitheen, Dammam (SA); Mohammed Khair Hamdan Al-Solihat, Dammam (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/454,525

(22) Filed: Jan. 21, 2026

(30) Foreign Application Priority Data

Jan. 18, 2026 (SA) ................................ 1020260452

(51) Int. Cl.

*F03B 13/14* (2006.01)
*F03B 11/06* (2006.01)
*H02K 7/18* (2006.01)

(52) U.S. Cl.

CPC .............. *F03B 13/14* (2013.01); *F03B 11/06* (2013.01); *H02K 7/1823* (2013.01); *F05B 2220/706* (2013.01); *F05B 2240/50* (2013.01)

(58) Field of Classification Search

CPC ....... F03B 13/14; F03B 11/06; H02K 7/1823; F05B 2220/706; F05B 2240/50
See application file for complete search history.

(56) References Cited

U.S. PATENT DOCUMENTS

2012/0080883 A1 4/2012 Hobdy

FOREIGN PATENT DOCUMENTS

| | | | | |
|---|---|---|---|---|
| EP | 3324037 A2 * | 5/2018 | ............ F03B 13/186 |
| ES | 2 564 743 A1 | 3/2016 | |
| WO | WO 2017/012464 A1 | 1/2017 | |
| WO | WO 2017/095347 A1 | 6/2017 | |

OTHER PUBLICATIONS

Xiaofan Li, et al., "Dynamic characterization and performance evaluation of a 10-kW power take-off with mechanical motion rectifier for wave energy conversion", Ocean Engineering, vol. 250, Apr. 15, 2022, 110983, Excerpts only, 9 pages.

* cited by examiner

*Primary Examiner* — Viet P Nguyen
(74) *Attorney, Agent, or Firm* — Oblon, McClelland, Maier & Neustadt, L.L.P.

(57) ABSTRACT

A mechanical motion rectifier for use with a power take-off system includes a base exciter including a vertical shaft fixedly coupled to the base. An axle is supported by the vertical shaft and connectable to a power take-off component. A first wheel is rotatably coupled to the axle via a first bearing. A second wheel is rotatably coupled to the axle via a second bearing. A mass portion through which the vertical shaft extends that is movable along the vertical shaft relative to the axle. Inelastic strings operatively couple the mass portion to the first wheel and the second wheel, and elastic strings operatively couple the mass portion to the first wheel and the second wheel. The first wheel, the second wheel, the inelastic strings, and the elastic strings, together, rectify both half-cycles of linear oscillatory motion of the mass portion.

18 Claims, 8 Drawing Sheets

MECHANICAL MOTION RECTIFIERS FOR USE WITH POWER TAKE-OFF SYSTEMS

CROSS-REFERENCE TO RELATED APPLICATION

The present disclosure claims the benefit of Saudi patent application Ser. No. 10/202,60452, filed on Jan. 18, 2026 with the Saudi Authority for Intellectual Property Office, which is incorporated herein by reference in its entirety.

BACKGROUND

Technical Field

The present disclosure is generally directed to energy harvesting and conversion and, more particularly, to mechanical motion rectifiers for use with power take-off systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Harvesting energy from renewable sources is a critical global objective to ensure long-term sustainability. Among these sources, wave energy exhibits substantial potential due to its consistent availability and high energy density, surpassing other intermittent renewables sources such as wind and solar. Despite these advantages, wave energy remains underdeveloped at a commercial scale. The challenge lies in the conversion of the irregular, oscillatory motion of ocean waves into usable electrical power. Power take-off (PTO) systems are used to convert the oscillatory motion of ocean waves into energy. PTO represents the most challenging aspect of wave energy converters (WECs), both in terms of efficiency and mechanical complexity.

Several solutions have been developed and tested for PTO systems. Hydraulic PTO systems use fluid power mechanisms to convert wave motion, offering an ability to generate high force at low speeds, but at the cost of operational complexity and maintenance demands. Linear generator PTO systems directly transform mechanical motion into electricity, bypassing gears, but yield lower overall efficiency. Mechanical motion rectifiers (MMRs) convert bidirectional oscillating wave motion to unidirectional rotary motion, thereby enabling effective electrical generation. Most conventional MMRs rely on gear trains, ball screws, and one-way bearings, adapted from heavy-duty machinery.

However, existing mechanical PTO systems have several shortcomings and limitations. Gear-based MMR designs add significant mass and complexity to WECs, elevating costs and reducing reliability, especially in marine environments requiring minimal maintenance. Known string-based MMR systems further limit energy extraction to a single half-cycle oscillation, leaving potential generation untapped and diminishing their practical effectiveness. These factors collectively impede wave energy adoption despite recent progress in materials and modelling.

The above-mentioned known solutions suffer from one or more drawbacks hindering their adoption in connection with power take-off systems, such as excessive weight, mechanical complexity, limited energy extraction, and reliability issues. Accordingly, it is one object of the present disclosure to provide an MMR for use with a power take-off system capable of effectively harvesting energy from both half-cycles of oscillatory wave motion. The MMR improves conversion efficiency, reduces system mass, and enables scalable deployment of wave energy technology, advancing the realization of sustainable energy goals.

SUMMARY

In an exemplary embodiment, a mechanical motion rectifier for use with a power take-off system is described. The mechanical motion rectifier includes a base exciter which includes a vertical shaft fixedly coupled thereto. The mechanical motion rectifier further includes an axle defining a rotation axis. The axle is supported by the vertical shaft and connectable to a power take-off component. A first wheel is rotatably coupled to the axle via a first bearing. A second wheel is rotatably coupled to the axle via a second bearing. Each of the first wheel and the second wheel are configured to partially rotate about the rotation axis in a primary direction together with the axle during positive-displacement wheel strokes and a secondary direction, opposite to the primary direction, independent of the axle during return-displacement wheel strokes. A mass portion through which the vertical shaft extends that is movable along the vertical shaft relative to the axle. Inelastic strings are operatively coupling the mass portion to the first wheel and the second wheel. Each of the inelastic strings is configured to apply a primary tensile force to the first or the second wheel based on relative movement of the mass portion. The primary tensile force urges the first or the second wheel to rotate about the rotation axis in the primary direction while generating an output torque applied to the axle; and elastic strings operatively coupling the mass portion to the first wheel and the second wheel. Each of the elastic strings is configured to apply a secondary tensile force to the first or the second wheel based on the relative movement of the mass portion. The secondary tensile force urges the first or the second wheel to rotate about the rotation axis in the secondary direction. The first wheel, the second wheel, the inelastic strings, and the elastic strings, together, are configured to rectify both half-cycles of linear oscillatory motion of the mass portion such that the output torque causes the axle to rotate continuously in the primary direction.

In some embodiments, each of the first bearing and the second bearing includes a one-way bearing.

In some embodiments, the mass portion includes at least one abutment surface defining an aperture centrally disposed on the mass portion in which the vertical shaft is inserted. The abutment surface is configured to slide against the vertical shaft to guide movement of the mass portion concentrically along the vertical shaft.

In some embodiments, the axle is oriented perpendicular to the vertical shaft.

In some embodiments, the vertical shaft is positioned between the first wheel and the second wheel.

In some embodiments, the mass portion includes a first body defining a first end of the mass portion. The first body is attached to a first inelastic string and a first elastic string that are routed from the first body to the first wheel. The mass portion further includes a second body spaced apart from the first body that defines a second end of the mass portion opposite to the first end. The second body is attached to a second inelastic string and a second elastic string that are routed from the second body to the second wheel, and an intermediate body coupling the first body to the second body.

In some embodiments, each of the first and second bodies of the mass portion includes a disc concentric with the vertical shaft and a string attachment mechanism disposed on an inner side of the disc facing the axle.

In some embodiments, the intermediate body of the mass portion includes a first wall extending vertically between the first and the second bodies of the mass portion parallel to the vertical shaft.

In some embodiments, the intermediate body of the mass portion further includes a second wall extending vertically between the first and second bodies of the mass portion parallel to the vertical shaft. The vertical shaft is centrally positioned between the first and second walls. In some embodiments, the axle is positioned between the first body and the second body of the mass portion.

In another exemplary embodiment, a power take-off system is described. The power take-off system includes an electrical generator; and a mechanical motion rectifier (MMR) operatively coupled to the electrical generator that is configured to receive a wave energy. The MMR includes a base exciter including a vertical shaft fixedly coupled thereto. An axle defining a rotation axis. The axle is supported by the vertical shaft and connected to the electrical generator. A first wheel is rotatably coupled to the axle via a first bearing. A second wheel is rotatably coupled to the axle via a second bearing. Each of the first wheel and the second wheel is configured to partially rotate about the rotation axis in a primary direction together with the axle during positive-displacement wheel strokes and a secondary direction, opposite to the primary direction, independent of the axle during return-displacement wheel strokes. A mass portion through which the vertical shaft extends that is movable along the vertical shaft relative to the axle. Inelastic strings are operatively coupling the mass portion to the first wheel and the second wheel. Each of the inelastic strings is configured to apply a primary tensile force to the first wheel or the second wheel based on relative movement of the mass portion. The primary tensile force urges the first or the second wheel to rotate about the rotation axis in the primary direction while generating an output torque applied to the axle, and elastic strings are operatively coupling the mass portion to the first wheel and the second wheel. Each of the elastic strings is configured to apply a secondary tensile force to the first or the second wheel based on the relative movement of the mass portion. The secondary tensile force urges the first wheel or the second wheel to rotate about the rotation axis in the secondary direction. The first wheel, the second wheel, the inelastic strings, and the elastic strings, together, are configured to rectify both half-cycles of linear oscillatory motion of the mass portion such that the output torque causes the axle to rotate continuously in the primary direction.

In some embodiments, each of the first bearing and the second bearing includes a one-way bearing.

In some embodiments, the mass portion includes at least one abutment surface defining an aperture centrally disposed on the mass portion in which the vertical shaft is inserted. The abutment surface is configured to slide against the vertical shaft to guide movement of the mass portion concentrically along the vertical shaft.

In some embodiments, the axle is oriented perpendicular to the vertical shaft.

In some embodiments, the vertical shaft is positioned between the first wheel and the second wheel.

In some embodiments, the mass portion includes a first body defining a first end of the mass portion. The first body is attached to a first inelastic string and a first elastic string that are routed from the first body to the first wheel. A second body is spaced apart from the first body that defines a second end of the mass portion opposite to the first end. The second body is attached to a second inelastic string and a second elastic string that are routed from the second body to the second wheel, and an intermediate body coupling the first body to the second body.

In some embodiments, each of the first body and second body of the mass portion includes a disc concentric with the vertical shaft and a string attachment mechanism disposed on an inner side of the disc facing the axle.

In some embodiments, the intermediate body of the mass portion includes a first wall extending vertically between the first and the second bodies of the mass portion parallel to the vertical shaft.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
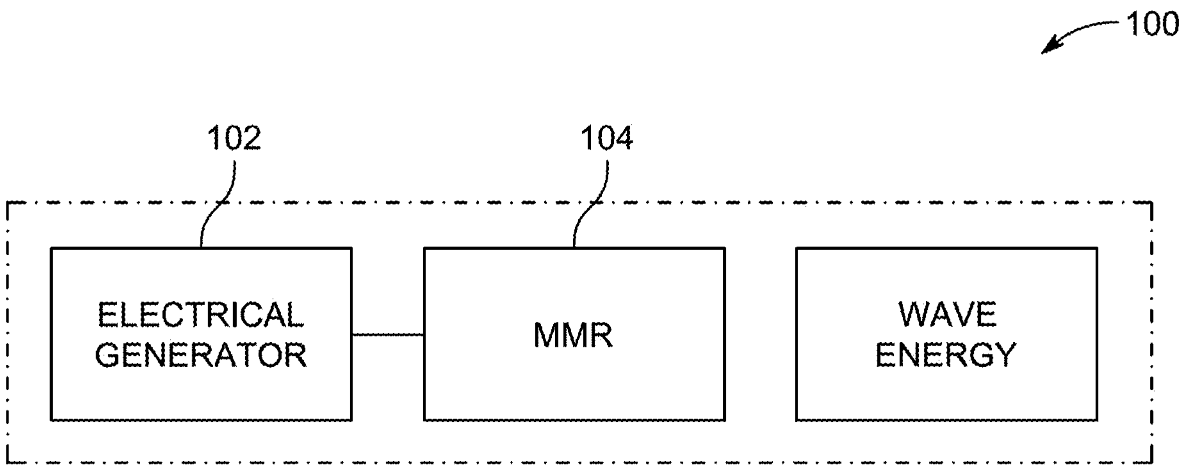
FIG. 1 is a schematic block diagram of a power take-off system in which examples disclosed herein can be implemented, according to certain embodiments.

In the drawings, like reference numerals designate identical or corresponding parts throughout the several views.

Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed towards mechanical motion rectifiers (MMRs) for use with power take-off systems, for example, in wave energy conversion applications. A disclosed MMR includes a string-type MMR having multiple interconnected components working together to harvest energy from both half-cycles of oscillatory motion (e.g., ocean wave motion) input to the MMR, addressing a fundamental challenge in renewable energy systems, particularly for marine or ocean applications. Examples disclosed herein employ a dual-wheel architecture including a movable mass portion that drives wheel motion of the MMR in an alternating manner via strings members operatively coupling the mass portion to a pair of rotatable wheel members. In particular, examples disclosed herein utilize an advantageous combination of (a) non-elastic or inelastic string members for providing positive-displacement wheels strokes that generate output torque of the MMR and (b) elastic string members for providing return-displacement wheel strokes that reset wheel position. Additionally, the elastic string members may provide a damping effect to the MMR or otherwise alter motion of the mass portion and the wheels in a predictable manner, such that the disclosed MMR forms a tunable mass-spring-damper system having a natural frequency, for example, at which angular wheel velocity peaks. In one embodiment, each wheel is coupled to the mass portion through at least one inelastic string and at least one elastic string.

The disclosed MMR is provided with a base exciter (e.g., a buoyant body) including a shaft fixedly coupled thereto that may have a substantially vertical orientation, which receives excitation energy (e.g., wave energy) from an environment in which the MMR is deployed. The shaft serves as a guide for the mass portion and, in one embodiment, extends centrally through the mass portion so that the mass portion moves concentrically along the shaft. An axle defining a wheel rotation axis is supported by the shaft and, in one embodiment, may be connectable to a power take-off component (e.g., directly or indirectly), such as an input or shaft to an electrical generator. First and second wheels of the dual-wheel architecture are rotatably coupled to the axle via bearings (e.g., one-way bearings) of the respective wheels, such that the shaft of the base exciter is centrally positioned between the two wheels and moves in tandem therewith. In particular, these wheel bearings allow torque transfer when the wheel rotates about the rotation axis a single rotational direction but not an opposite rotational direction.

In operation, the mass portion is free to move linearly along the shaft (e.g., in a vertical direction) in response to base excitation. Generally speaking, the disclosed strings form particular connections between the mass portion and the different wheels such that sinusoidal, linear motion of the mass portion relative to the wheels (and vice versa) generates tension in the inelastic and elastic strings that changes throughout wheel rotation cycles. In some examples, the disclosed string architecture employs two different types of strings per wheel, with the pair being anchored to distinct portions of the oscillating mass (e.g., topmost and bottommost portions of the mass). For example, with respect to a single wheel, the elastic string is utilized to store potential energy, assist in wheel retraction, and/or facilitate energy smoothing, while the inelastic string directly transfers tensile force to rotate the wheel via angular displacement. This dual-string approach enables bidirectional oscillation of the mass to result in continuous unidirectional rotation at the wheels, without requiring a heavy or complex gear train.

As will be described in greater detail below, the two wheels, the inelastic strings, and the elastic strings, together, are configured to rectify both half-cycles of linear oscillatory motion (e.g., vertical motion) of the mass portion such that the output torque of the MMR is continuous in a single direction to effectively operate the power take-off component. In some examples, each half-cycle of vertical motion of the mass portion results in a different one of the wheels being tensioned and rotated unidirectionally for torque transfer, while the other wheel resets via a torsional spring created by the related elastic string. Such disclosed examples enable the harvesting of kinetic energy and efficient conversion thereof into electrical energy in both half-cycles of excitation. Further, the natural frequency of the MMR can be tuned based on the application, such that energy conversion efficiencies peak at a target input frequency.

By capturing energy during both wheel strokes of wave-induced oscillation, the MMR significantly improves conversion efficiency compared to the above-mentioned known MMR devices. The disclosed dual-wheel and string-based architecture reduces overall system mass by eliminating redundant power-conversion components and enable scalable deployment across diverse wave energy installations. The MMR disclosed herein contributes to the broader realization of sustainable energy goals and the diversification of renewable energy portfolios. While the disclosed MMR is particularly useful in connection with wave energy harvesting, examples disclosed herein can be advantageously utilized in a wide range of applications involving oscillatory motion present in an environment.

Referring to FIG. 1, illustrated is a schematic block diagram of a power take-off system 100 in which examples disclosed herein can be implemented, according to certain embodiments. The power take-off system 100 is an apparatus configured to transfer mechanical power from a primary power source, such as an engine or a motor, to an auxiliary equipment that may require external power to operate.

In some examples, the power take-off system 100 includes an electrical generator 102, which is configured to convert mechanical energy from the primary power source into electrical power for the auxiliary equipment. When engaged, the power take-off system 100 channels rotational input to the electrical generator 102 to produce a controlled electrical output.

The power take-off system 100 of FIG. 1 further includes a mechanical motion rectifier (MMR) 104 operatively coupled to the electrical generator 102 and configured to receive energy (e.g., a wave energy) from an external environment. In one example, the MMR 104 receives wave-induced mechanical energy from ocean waves. Generally speaking, the MMR 104 may receive energy from any environment, medium, or source in which oscillatory motion is present, where particles, objects, components, etc. move back and forth in a sinusoidal manner. Ocean waves can serve as an input that drives the conversion process within the MMR 104. For example, as ocean waves pass through the power take-off system 100, oscillatory motion of the ocean waves is transmitted to the MMR 104 or an exciter thereof.

According to the illustrated example of FIG. 1, the MMR 104 converts bidirectional oscillatory motion provided by the wave energy into a usable, unidirectional rotational output of an MMR component (e.g., an output axle or shaft) connected to the electrical generator 102, which enables the electrical generator 102 to produce continuous and/or reliable electricity in an efficient manner. As will be described in greater detail below, the MMR 104 of FIG. 1 drives the electrical generator 102 by harvesting energy from both half-cycles of wave motion associated with the wave energy, enhancing conversion efficiency while reducing complexity and mass of the power take-off system 100.

In some examples, the power take-off system 100 may include an input interface coupled to an engine and an engagement mechanism that selectively enables or disables power transfer. Further, the power take-off system 100 may be provided with an output interface that delivers the usable torque or hydraulic energy to an attached implement or accessory.

In operation, the power take-off system 100 operates by receiving mechanical input from the MMR 104. The MMR 104 converts irregular or bidirectional motion into a continuous and stable unidirectional rotational output that is supplied to the electrical generator 102, enabling efficient and consistent electricity generation. Further, the power take-off system 100 provides reliable electrical power to the auxiliary equipment.

Figure 2A:
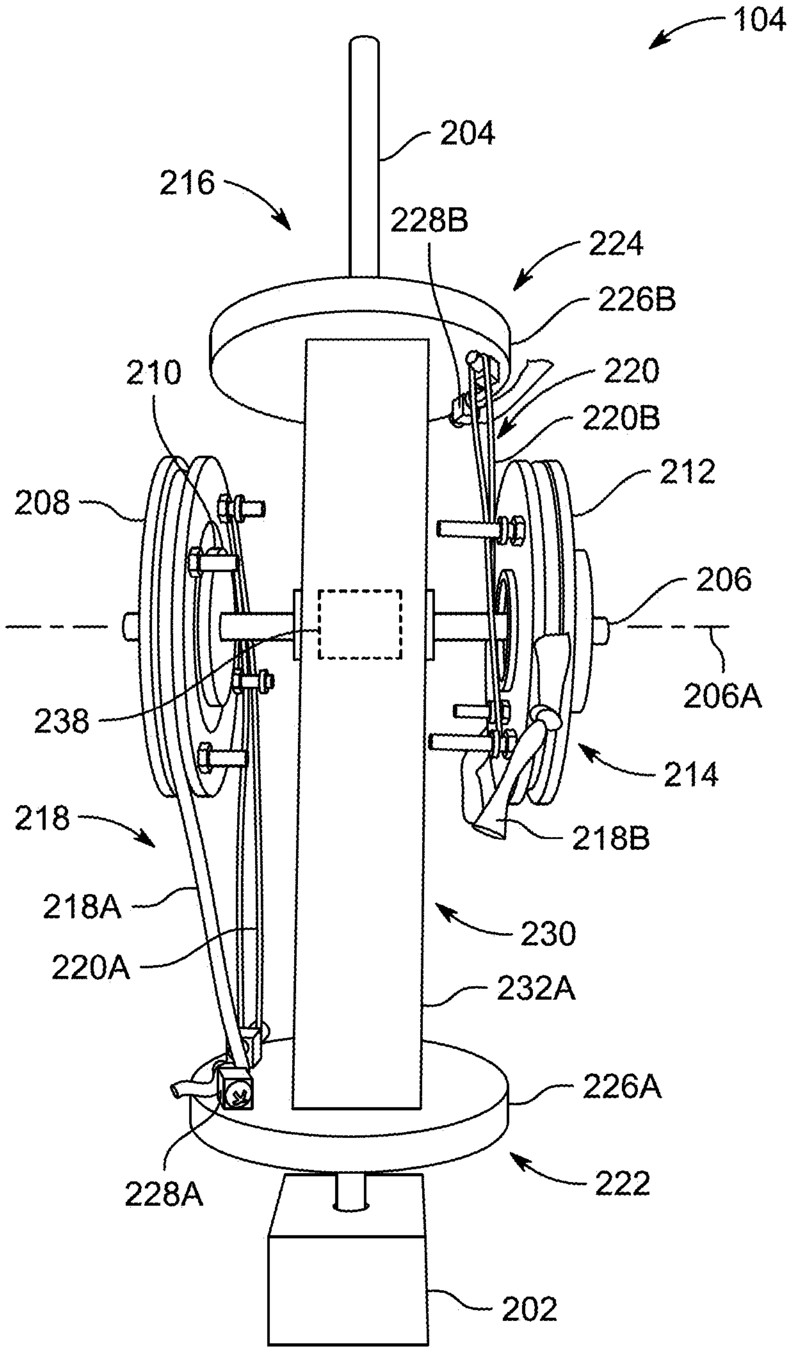
FIG. 2A is a front view of an (MMR), according to certain embodiments.

Referring to FIG. 2A, a front view of the MMR 104, is illustrated, according to certain embodiments. According to the illustrated example of FIG. 2A, the MMR 104 includes a base exciter 202. The base exciter 202 refers to an input mechanism of the MMR 104 that is urged into a state of oscillatory or bidirectional motion by the wave energy, which the MMR 104 then converts into unidirectional rotation. In some examples, the base exciter 202 of FIG. 2A is cuboid-shaped or rectangular, serving as a main structural and foundational component of the MMR 104. However, in other examples, the base exciter 202 is shaped differently while maintaining a desired mass distribution suitable for the disclosed rectification process.

The base exciter 202 includes a primary body (e.g., a buoyant body) and a shaft (e.g., a vertical shaft) 204 fixedly coupled the primary body that extends away therefrom in a substantially vertical direction. In one example, the primary body is buoyant or has a buoyant characteristic associated therewith, such that ocean waves may impart buoyant forces on the primary body of the base exciter 202. The shaft 204 of FIG. 2A serves as a central structural component of the MMR 104. The shaft 204 may be used as a guide for structural components that move concentrically along the vertical axis-performing vertical oscillations. A mechanical coupling between the primary body and the shaft 204 can be achieved, for example, via one or more fasteners and/or fastening methods or techniques. Further, the shaft 204 enables efficient transmission of motion or force from the base exciter 202 to other, movable MMR components, thereby supporting the intended operation and structural integrity of the MMR 104.

Each of the shaft 204 and/or the base exciter 202 can be constructed of one or more materials suitable for an environment (e.g., a marine or ocean environment) in which the MMR 204 is implemented such as, for example, metals (e.g., any of steel, titanium, copper, etc.), plastics (e.g., any of polyethylene, polyvinyl chloride (PVC), polypropylene, acrylic, etc.), and the like, or a combination thereof. Such materials may be selected based on any of strength, durability, corrosion resistance, ultraviolet (UV) radiation resistance, etc., depending on the application.

The MMR 104 of FIG. 2A also includes an axle 206 defining a rotation axis 206A. The axle 206 is supported (e.g., rotatably supported) by the shaft 204, for example, via a bearing operatively coupled between the axle 206 and the shaft 204. In some examples, the axle 206 may serve only as a support structure for wheel members that maintains an orientation of the rotation axis 206A. In other examples, the axle 206 serves an output of the MMR 104. That is, the axle 206 of FIG. 2A is connectable to the electrical generator 102, such that rotational motion of the axle 206 about the rotation axis 206A operates the electrical generator 102. For example, the axle 206 may be directly coupled to the electrical generator 102 or an input (e.g., a shaft) thereof, for example, via one or more fasteners and/or fastening methods or techniques. Alternatively, the axle 206 may be indirectly coupled to the electrical generator 102, for example, via one or more intermediate components operatively interposed between the axle 206 and the electrical generator 102 or the input thereof. In one example, the MMR 104 is provided with a transmission system configured to transfer output torque from the MMR 104 or the axle 206 thereof to the electrical generator 102. In such examples, as the axle 206 rotates about the rotation axis 206A in a single direction, torque may be transferred from the axle 206 to the electrical generator 102 (directly through or around the shaft 204), ensuring synchronized movement between the connected components. Accordingly, torque transmission from the axle 206 to the electrical generator 102 may be independent of the shaft 204, in such examples. This configuration can provide stable power transmission, support precise motion control, and/or enable efficient operation of the components linked to the axle 206.

In some examples, the axle 206 is oriented perpendicular to the shaft 204, and such an orientation of the axle 206 relative to the shaft 204 may be substantially maintained when the MMR 104 is in operation. The perpendicular orientation facilitates efficient mechanical interaction between the rotating components and linearly moving elements. The arrangement may ensure stability and/or reliable force transmission while providing a spatial configuration suitable for the intended operational requirements.

According to the illustrated example of FIG. 2A, the MMR 104 is provided with a dual-wheel architecture that employs a string-suspended, movable mass operatively interposed between the base exciter 202 and the axle 206, a momentum of which is utilized to generate tension in strings to drive alternating wheel motion. The MMR 104 of FIG. 2A includes a first wheel 208 that is rotatably coupled to the axle 206 via a first bearing 210. Additionally, the MMR 104 also includes a second wheel 212 that is rotatably coupled to the axle 206 via a second bearing 214. Each of the first wheel 208 and the second wheel 212 is configured to partially rotate about the rotation axis 206A in (1) a primary direction $A_{X1}$ (e.g., shown in FIG. 3A and FIG. 3B) together with the axle 206 during positive-displacement strokes of the wheels 208, 212 and (2) a secondary direction $A_{X2}$ (e.g., shown in FIG. 3A and FIG. 3B) independent of the axle 206 during return-displacement strokes of the wheels 208, 212. Such a functional configuration of the two wheels 208 and 212 and the axle 206 is achieved, for example, by using one-way bearings or clutches, where torque is allowed to be substantially transferred from a wheel 208 or 212 to the axle 206 in a single rotational direction but not in an opposing direction.

Generally speaking, the first and second bearings 210 and 214 of FIG. 2A are configured to facilitate smooth rotational movements of the first wheel 208 and the second wheel 212 about the axle 206, thereby reducing friction and wear. The arrangement provides reliable operation and mechanical stability, which enhances the efficiency and service life of the MMR 104.

In some examples, during positive-displacement wheel strokes, both the first wheel 208 and the second wheel 212 rotate together with the axle 206 in the primary direction $A_{X1}$, transmitting torque and motion required for the operational cycle of the MMR 104. It should be understood that the first and second wheels 208 and 212 may cyclically alternate between performing a positive displacement-wheel stroke that unidirectionally drives the axle 206 or output member of the MMR 104. For example, when the first wheel 208 is undergoing a positive-displacement stroke thereof corresponding to a first half-cycle of oscillatory motion, the second wheel 212 may be returning to an initial position thereof, such that positive wheel displacement strokes do not occur simultaneously with respect to the first and second wheels 208 and 212. This coordinated motion with the axle 206 is beneficial to driving mechanical loads or propagating the movement through the MMR 104.

Conversely, in some examples during return-displacement wheel strokes, each of the first wheel 208 and the second wheel 212 rotates in the secondary direction $A_{X2}$, opposite to the primary direction $A_{X1}$, independently of the axle 206. It should be understood that the first and second wheels 208 and 212 may cyclically alternate between performing a return displacement-wheel stroke that resets wheel position. For example, when the first wheel 208 is undergoing a return-displacement stroke thereof corresponding to a second half-cycle of oscillatory motion, the second wheel 212 may be undergoing a positive-displacement wheel stroke thereof, such that return wheel displacement strokes do not occur simultaneously with respect to the first and second wheels 208 and 212. In such examples, a wheel 208 or 212 is configured to mechanically disconnect from the axle 206 via the respective bearing 210 or 214 during such a return stroke, so that the axle 206 is unimpeded in rotating continuously in the single direction through cyclical wheel movements. That is, each wheel 208, 212 may reverse its rotation without direct torque coupling to the axle 206, allowing the wheels 208, 212 to reset or reposition for subsequent operation cycles.

The dual-directional and partially independent movement of the wheels 208 and 212 enables complex mechanical functions including, for example, variable displacement, controlled actuation cycles, and/or precise mechanical timing. The selective combination of coupling and decoupling wheel rotation between the two wheels 208 and 212 and the axle 206 improves operational efficiency, reduces wear by minimizing unnecessary force transmission, and enhances control over movement sequences. This configuration may be advantageous in systems requiring alternating or reciprocating mechanical inputs, thereby providing improved precision and overall performance.

In some examples, each of the first bearing 210 and the second bearing 214 includes a one-way bearing configured to permit rotational movement in only one direction with respect to the rotation axis 206A while preventing rotation in the opposite direction to allow torque transfer through the bearing. In addition, the first and second bearings 210 and 214 are also configured to provide a certain level of rotational support to the first and second wheels 208 and 212, respectively, where the first wheel 208 is rotatably supported on the axle 206 via the first bearing 210 and the second wheel 212 is rotatably supported on the axle 206 via the second bearing 214. Each of the first and second bearings 210 and 214 can be implemented, for example, using a clutch bearing such as a needle-type clutch bearing, a sprag-type clutch bearing, cam-type clutch bearings, etc.

In some embodiments, the shaft 204 is positioned centrally between the first wheel 208 and the second wheel 212, as shown in FIG. 2A. The central positioning of the shaft 204 relative to the two wheels 208 and 212 facilitates balanced load distribution and promotes mechanical symmetry. The arrangement further supports coordinated operation of both the wheels 208, 212, enabling stable and efficient transmission of forces and motion within the MMR 104.

For the purpose of facilitating controlled momentum transfer between the base exciter 202 and the two wheels 208 and 212, the MMR 104 also includes a mass portion (e.g., a suspended body or weight) 216 that is movable along the shaft 204 relative to both the axle 206 and the first and second wheels 208 and 212. The mass portion 216 of FIG. 2A is suspended from at least one of the first or second wheel 208 or 212 through a string architecture of the MMR 104 that employs a combination of different string characteristics and/or properties (e.g., any of stiffness, rigidity, elasticity, durability, etc.) to transfer operational loads between the movable mass portion 216 and each of the first and second wheels 208 and 212. The adjustable, guided movement of the mass portion 216 along the shaft 204 enables modification of balance, force distribution, and/or load application to tune performance characteristics, vibration response, and/or mechanical behavior of the MMR 104. The longitudinal mobility of the mass portion 216 along the shaft 204 provides operational versatility, allowing the mechanical properties of the MMR 104 to be selectively customized or modulated in accordance with specific application requirements or varying operational conditions. In one example, to facilitate providing and/or maintaining symmetric loading conditions of the MMR 104, the shaft 204 extends at least partially or entirely through the mass portion 216, for example, such that the shaft 204 is aligned to a center of gravity (COG) of the mass portion 216.

The MMR 104 also includes inelastic strings 218 operatively coupling the mass portion 216 to the first wheel 208 and the second wheel 212, two of which are shown in the illustrated example of FIG. 2A (i.e., a first inelastic string 218A and a second inelastic string 218B). The first and second inelastic strings 218A and 218B may be collectively referred to herein as the inelastic strings 218, for clarity. The inelastic strings 218 are configured to transmit mechanical or tensile forces between the mass portion 216 and the wheels 208, 212 without substantial elongation, dampening, and/or energy loss due to stretching. The rigid coupling between the mass portion 216 and the wheels 208, 212 provides precise and consistent transfer of motion, thereby allowing movement of the mass portion 216 along the shaft 204 to directly influence the rotational behavior of the wheels 208, 212, and vice versa.

The inelastic strings 218 of FIG. 2A can be implemented using, for example, a monofilament string construction or a multifilament string construction. In some examples, at least one or all of the inelastic strings 218 include(s) a rigid or stiff material such as, for example, nylon, polyester, steel, etc., or a combination thereof. Additionally or alternatively, at least one or all of the inelastic strings 218 may be braided, stranded, woven, etc, and include(s) at least one of a single braid, a double braid, a diamond braid, a three-strand braid, and the like, or a combination thereof. In general, each of the inelastic strings 218 has an inelastic characteristic associated therewith that is provided via string construction, material selection, or a combination thereof.

The MMR 104 also includes elastic strings 220 operatively coupling the mass portion 216 to the first wheel 208 and the second wheel 212, two of which are shown in the illustrated example of FIG. 2A (i.e., a first elastic string 220A and a second elastic string 220B). The first and second elastic strings 220A and 220B may be collectively referred to herein as the elastic strings 220, for clarity. In contrast to the inelastic strings 218, the elastic strings 220 are designed to stretch, elongate, contract, flex, and/or otherwise change state in response to movements (e.g., vertical movements) of the mass portion 216 relative to the wheels 208, 212, thereby enabling the transmission of varying tensile forces and allowing for controlled relative displacement among the connected components. The elastic strings 220 may facilitate energy storage, dampening of vibrations or wheel motion, and/or smoother motion transitions, ultimately contributing to improved mechanical performance and adaptability in various operational scenarios.

The elastic strings 220 of FIG. 2A can be implemented using, for example, a monofilament string construction or a multifilament string construction. In some examples, at least one or all of the elastic strings 220 include(s) an elastic or flexible material such as, for example, natural latex rubber, synthetic rubber, one or more polymers, and the like, or a combination thereof. Additionally or alternatively, at least one or all of the elastic strings 220 may be braided, stranded, woven, etc, and include(s) at least one of a single braid, a double braid, a diamond braid, a three-strand braid, and the like, or a combination thereof. In general, each of the elastic strings 220 has an elastic characteristic associated therewith that is provided via string construction, material selection, or a combination thereof, which is different from the inelastic characteristic associated with the inelastic strings 218. Each of the elastic strings 220 is configured generate a secondary tensile force and apply the secondary tensile force to a respective one of the two wheels 208 and 212, thereby resetting wheel position. In particular, a magnitude of the secondary tension varies based on a relative position of the mass portion 216.

When the MMR 104 is in operation, the wave energy (or another input source) applied to base exciter 202 urges the shaft 204, along with all components supported the shaft 204, to move in an oscillatory manner. In one example, the axle 206 and the two wheels 208 and 212 are urged to move vertically between upwards and downwards directions relative to the mass portion 216, which alters tension in the inelastic strings 218 and the elastic strings 220. Such vertical, relative motion can be characterized by, for example, a sinusoidal wave function having an amplitude, a frequency, a wavelength, etc., where the base exciter 202 and the mass portion 216 each encounter local minimums and maximums throughout motion cycles.

During mechanical motion rectification, each of the first and second wheels 208 and 212 only partially rotates about the rotation axis 206A, for example, between two angularly spaced positions. Stated differently, the first and second wheels 208 and 212 alternate in rotation about the rotation axis 206A between positional limits. Such positions or angular limits of the respective wheels 208 and 212 are defined by the inelastic and elastic strings 218 and 220 or one or more parameters thereof such as, for example, string length, string pre-tension or static tension, spring rate, and the like, or a combination thereof. In an embodiment, an angular displacement of the first wheel 208 and/or the second wheel 212 is less than 20 degrees when rotating about the rotation axis 206A in the primary direction $A_{X1}$ or secondary direction $A_{X2}$.

According to the illustrated example of FIG. 2A, the first wheel 208, the second wheel 212, the inelastic strings 218, and the elastic strings 220, together, are configured to rectify both half-cycles of linear oscillatory motion of the mass portion 216, such that generated wheel output torque causes the axle 206 to rotate continuously in the primary direction $A_{X1}$. In this configuration, the MMR 104 operates as a full-wave mechanical rectifier, converting bidirectional linear input motion into unidirectional rotational output, which is better illustrated in FIGS. 3A and 3B and described in greater detail below. During the positive-displacement half-cycle, the mass portion 216 may move in a manner that increases tension in the inelastic strings 218. This increased tension generates the primary tensile force $F_P$, which causes the respective wheel 208, 212 to rotate in the primary direction $A_{X1}$ together with the axle 206, thereby producing the output torque of the MMR 104.

During the negative-displacement stroke, the mass portion 216 may move in the reverse linear direction. Instead of allowing the wheels 208, 212 to generate output torque of the MMR 104, the elastic strings 220 generate and/or apply a secondary tensile force $F_S$ based on energy stored in the elastic strings 220. The secondary tensile force $F_S$ causes the respective wheel 208, 212 to rotate in the secondary direction $A_{X2}$ independently of the axle 206, allowing the wheel to return to its initial position while the axle 206 maintains its rotational orientation. This return motion prepares the wheel for the subsequent positive-displacement half-cycle, thereby enabling continuous unidirectional rotation of the axle 206.

In some examples, the mass portion 216 of FIG. 2A includes a first body (e.g., disc-shaped body) 222 defining a first end of the mass portion 216. The first body 222 is fixedly attached to the first inelastic string 218A and the first elastic string 220A, for example, via one or more fasteners and/or fastening methods or techniques. The first inelastic string 218A and the first elastic string 220A are routed from the first body 222 of the mass portion 216 to the first wheel 208 or an outer radial portion thereof. Each of the first inelastic string 218A and the first elastic string 220A may extend along an outer radial edge of the first wheel 208 or at least a partial length thereof and is fixedly coupled thereto, for example, via one or more fasteners and/or fastening methods or techniques. The first inelastic string 218A provides a rigid transmission path for force and positional changes, while the first elastic string 220A introduces controlled flexibility and/or variability. Together, these string-based connections enable balanced mechanical responsiveness and improved functional control of the first wheel 208 and/or the mass portion 216.

The mass portion 216 further includes a second body (e.g., a disc-shaped body) 224 spaced apart from the first body 222 that defines a second end of the mass portion 216 opposite to the first end. The second body 224 is fixedly attached to the second inelastic string 218B and the second elastic string 220B, for example, via one or more fasteners and/or fastening methods or techniques. The second inelastic string 218B and the second elastic string 220B are routed from the second body 224 of the mass portion 216 to the second wheel 212 or an outer radial portion thereof. Each of the second inelastic string 220A and the second elastic string 220B may extend along an outer radial edge of the second wheel 212 or at least a partial length thereof and is fixedly coupled thereto, for example, via one or more fasteners and/or fastening methods or techniques. The second inelastic string 218B provides a rigid transmission path for force and positional changes, while the second elastic string 220B introduces controlled flexibility. Together, these string-based connections enable balanced mechanical responsiveness and improved functional control of the second wheel 212 and/or the mass portion 216.

In some embodiments, the axle 206 is positioned between the first body 222 and the second body 224 of the mass portion 216. The placement promotes balanced force distribution and mechanical symmetry, while supporting coordinated interaction between the mass portion 216 and the wheels 208, 212 thereby enhancing stability and/or improving motion transfer consistency.

In some embodiments, each of the first body 222 and second body 224 of the mass portion 216 includes a disc 226A, 226B concentric with the shaft 204 and a string attachment mechanism 228A, 228B disposed on an inner side of the disc 226A,226B facing the axle 206. That is, the first body 222 of FIG. 2A includes a first disc 226A and a first string attachment mechanism 228A thereon, and the second body 224 includes a second disc 226B and a second string attachment mechanism 228B thereon. These string attachment mechanisms 228A and 228B facilitate the secure attachment of inelastic strings 218 and the elastic strings 220 to the first body 222 and the second body 224. The first and second string attachment mechanisms 228A and 228B can be implemented, for example, using one or more fasteners (e.g., screws, bolts, adhesives, clamps) and/or one or more receptacles (e.g., threaded holes defined by mounting blocks) in which the respective fasteners are insertable to attach the stings 218 and 220.

In some examples, the mass portion 216 further includes an intermediate body 230 that couples the first body 222 to the second body 224. The intermediate body 230 can be fixedly coupled between the first and second bodies 222 and 224 of the mass portion 216, for example, via one or more fasteners and/or fastening methods or techniques. In one example, the intermediate body 230 is integrally formed with the first body 222 and/or the second body 224, for example, via one or more subtractive or additive fabrication processes. The intermediate body 230 functions as a central structural connector configured to maintain precise alignment and spacing between the two end bodies of the mass portion 216, thereby contributing to overall rigidity and structural integrity. The intermediate body 230 enables effective distribution of mechanical loads and supports attachments routed between the first body 222 and the second body 224. This configuration facilitates reliable force transmission and coordinates movement within the mass portion 216.

In some examples, the intermediate body 230 includes a first wall (e.g., a central wall) 232A extending vertically between the first body 222 and the second body 224 of the mass portion 216 and parallel to the shaft 204. The orientation and/or position of the first wall 232A within the MMR 104 can promote uniform load transfer, facilitate assembly, and/or ensure reliable guidance of relative motion.

In some examples, the MMR 104 further includes a third bearing 238 configured to rotatably support the axle 206 on the shaft 204, which enables the two structures 204 and 206 to intersect in position while maintaining independent functionality. In such examples, the axle 206 extends through and/or is fixedly coupled to an inner member (e.g., an inner ring defining a bore) of the third bearing 238, while the shaft 204 or at least part thereof is fixedly coupled to an outer member (e.g., an outer ring) of the third bearing 238. The third bearing 238 provides additional structural support, ensures smooth rotation, and/or reduces mechanical stress, thereby enhancing the overall reliability and efficiency of the MMR 104. The third bearing 238 can be implemented, for example, using any of a ball bearing, roller bearing, a thrust bearing, a plain bearing, a fluid bearing, a magnetic bearing, and the like, or a combination thereof.

Figure 2B:
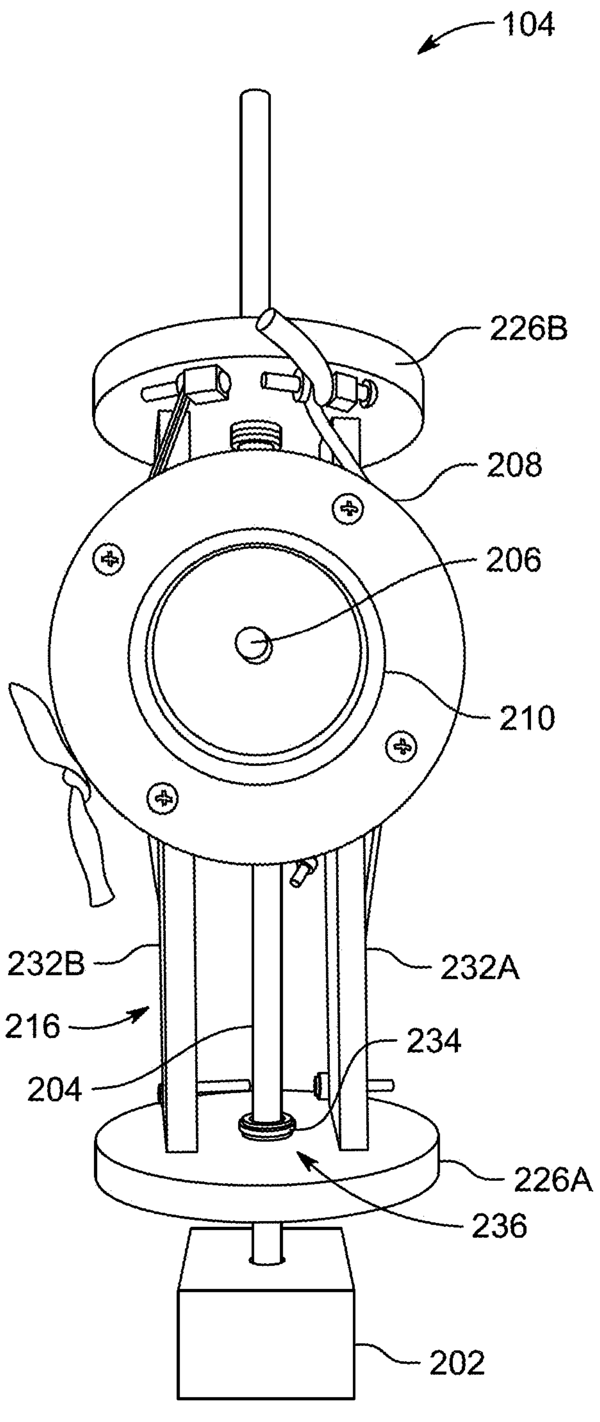
FIG. 2B is a side view of the MMR, according to certain embodiments.

Referring to FIG. 2B, a side view of the MMR 104 is illustrated, according to certain embodiments. In some examples, the intermediate body 230 of the mass portion 216 further includes a second wall 232B extending vertically between the first body 222 and the second body 224 of the mass portion 216. Further, the intermediate body 230 may be oriented parallel to the shaft 204. In such examples, the parallel orientation of the first and second walls 232A and 232B relative to the shaft 204 is configured to promote uniform load transfer, facilitate assembly, and ensure reliable guidance of relative motion.

To facilitate guiding linear motion of the mass portion 216 along the shaft 204 in a controlled manner, the mass portion 216 may be provided with at least one abutment surface 234 defining an aperture (e.g., a circular or round hole) 236. For clarity, a single abutment surface 234 associated with the first body 222 is described in connection with the illustrated example of FIG. 2B, aspects of which likewise apply to one or more other abutment surfaces of the mass portion 216 such as, for example, a different abutment surface disposed on the second body 224 or the second disc 226B thereof. According to the illustrated example of FIG. 2B, the aperture 236 is centrally disposed on the first disc 226A, and the shaft 204 is inserted in the aperture 236. The aperture 236 provides a passageway for the shaft 204 to be securely inserted. The central disposition of the aperture 236 relative to the mass portion 216 contributes to balanced load distribution and supports reliable mechanical engagement, facilitating proper function within the MMR 104.

In some examples, the at least one abutment surface 234 is configured to slide against the shaft 204 to guide linear movement of the mass portion 216 concentrically along the shaft 204, for example, between a first position and second vertical positions of the mass portion 216 along the shaft 204. Such frictional engagement associated with the abutment surface 234 stabilizes the interface between the mass portion 216 and the shaft 204, ensuring controlled longitudinal movement and precise positioning of the mass portion 216.

The abutment surface 234 of FIG. 2B includes, for example, an inner surface (e.g., an inner circumferential surface) of the first disc 226A configured to slidably engage an exterior of the vertical shaft. Additionally or alternatively, in some examples, the abutment surface 234 is implemented using a separate component that is attachable to the first disc 226A such as, for example, a bushing, a sleeve, a mechanical insert, and the like, or a combination thereof.

In some examples, the shaft 204 is centrally positioned between the first wall 232A and the second wall 232B, as shown in FIG. 2B. For example, a distance between the exterior of the shaft 204 and the first wall 232A is the same as, or substantially equal to, a distance between the exterior shaft 204 and the second wall 232B. In such examples, the positioning of the shaft 204 helps to establish a symmetrical arrangement within the mass portion 216, enhancing structural balance and load distribution, and ensuring stable support and accurate alignment of moving components.

As previously mentioned, the MMR 104 may be provided with a transmission system to facilitate transferring output torque generated by the first and second wheels 208 and 212 to a power take-off component such as the electrical generator 102. In one example, the transmission system is operatively coupled to the first and second bearings 210 and 214, where generated wheel torque transmitted through the respective first and second bearings 210 and 214 is received by the transmission system of the MMR 104, instead of the axle 206. In such examples, as the two wheels 208 and 212 alternate in generating wheel toque, the transmission system is configured to combine (a) a wheel torque transmitted through the first bearing 210 and (b) a different wheel torque transmitted through the second bearing 214. The transmission system can also be operatively coupled to the electrical generator 102 to provide the combined wheel torque thereto. Such a transmission system of the MMR 104 can include one or more components, mechanisms, and/or devices configured to combine separate torques from separate sources and transfer the combined torques of the MMR 104 to a component external to the MMR 104. For example, the transmission system of the MMR 104 is implemented using any of shafts, axles, adjustable joints (e.g., universal joints or U-joins), gear trains, differentials, clutches, and the like, or a combination thereof.

Figure 3A:
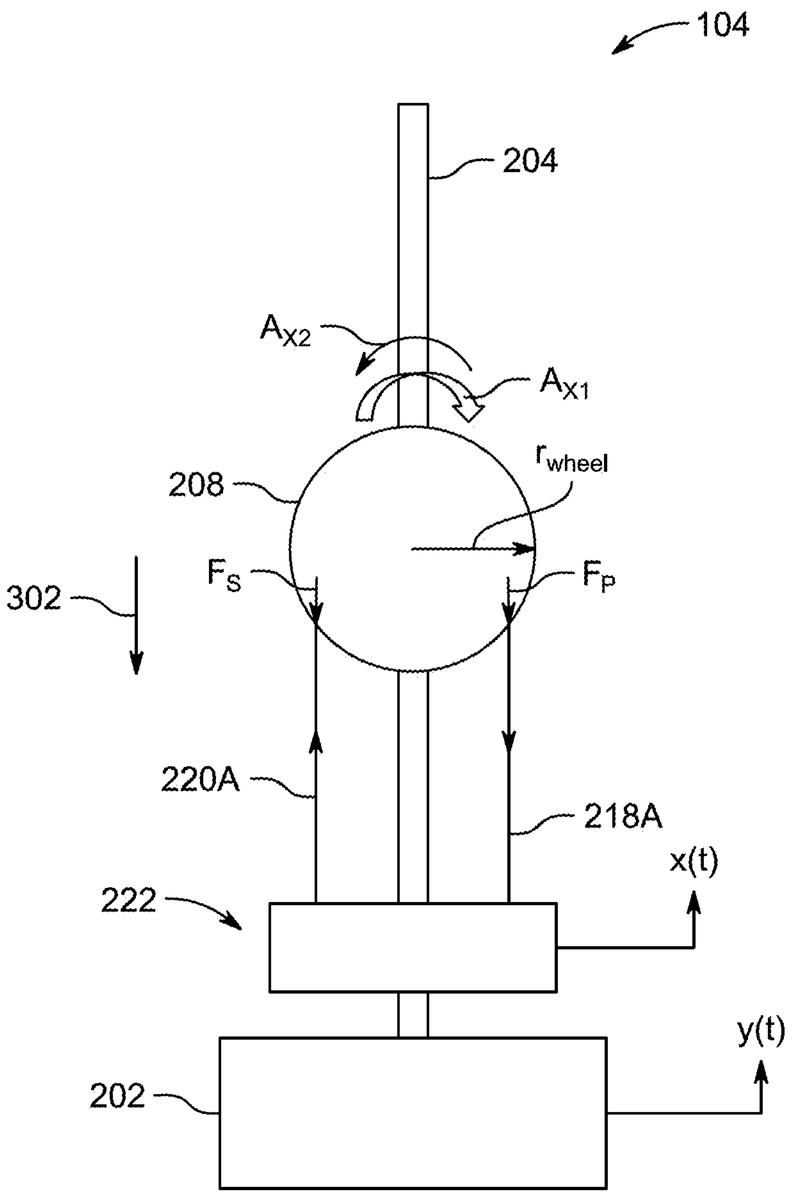
FIG. 3A is a schematic view of the MMR showing string connection and motion characteristics of a first wheel, according to certain embodiments.
Figure 3B:
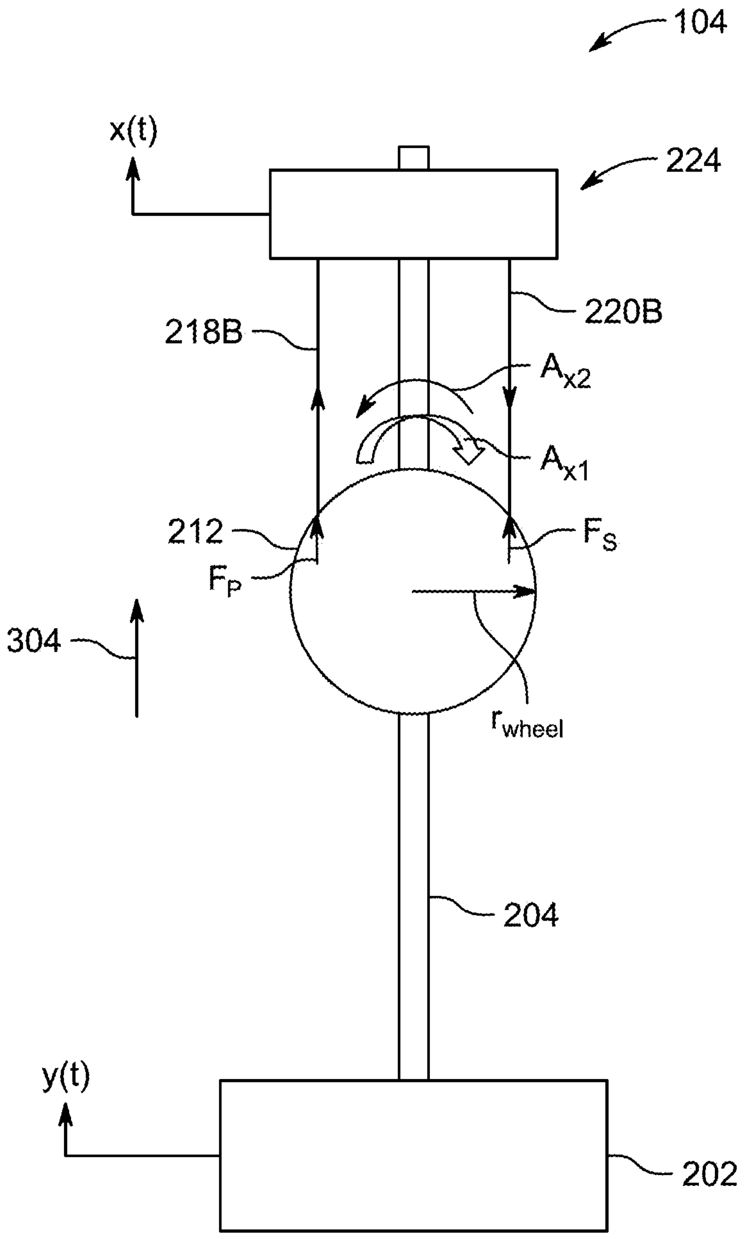
FIG. 3B is a schematic view of the MMR showing string connection and motion characteristics of a second wheel, according to certain embodiments.

Referring to FIG. 3A and FIG. 3B in combination, schematic diagrams of the MMR 104 showing string connections and motion characteristics of the first wheel 208 and the second wheel 212 are illustrated, according to certain embodiments. The diagram illustrated in FIG. 3A corresponds to a first half-cycle of oscillatory motion of the mass portion 216 during which the mass portion 216 moves relative to the base exciter 202 in a first linear direction 302, while the diagram illustrated in FIG. 3B corresponds to a second half-cycle of oscillatory motion of the mass portion 216 during which the mass portion 216 moves relative to the base exciter 202 in a second linear direction 304 opposite to the first linear direction 302.

Generally speaking, when the mass portion 216 oscillates vertically along the shaft 204 in response to base excitation, it tensions an inelastic string 218 connected to a respective one of the wheels 208 or 212, causing that wheel 208 or 212 to rotate, while the other wheel 208 or 212 returns to its original position due to a torsional spring effect generated by a respective one of the elastic strings 220 that acts on it. During oscillation in the opposite direction of the mass portion 216, this process is interchanged, keeping the wheels 208 and 212 continuously engaged with the string and spring mechanism. The wheels 208 and 212 are able to retract to their original position, for example, due to the incorporation of one-way bearings in the wheels 208 and 212. The displacement of the base exciter 202 is represented as y(t) and the displacement of the mass portion 216 as x(t), where t represents time.

With respect to positive-displacement wheel strokes generating the output torque of the MMR 104, each of the inelastic strings 218 is configured to apply a primary tensile force $F_P$ to the first wheel 208 or the second wheel 212 based on the relative movement of the mass portion 216. The primary tensile force $F_P$ urges the first wheel 208 or the second wheel 212 to rotate about the rotation axis 206A in the primary direction $A_{X1}$ while generating an output torque of the MMR 104. In some examples, this wheel output torque is applied to the axle 206 through a respective one of the first or second bearing 210 or 214. In other examples, the wheel output torque is applied, through a respective one of the first or second bearing 210 or 214, to the transmission system of the MMR 104 that combines separate torques together for delivery to a power take-off component.

On the other hand, with respect to return-displacement wheel strokes, each of the elastic strings 220 is configured to apply a secondary tensile force $F_S$ (e.g., a varying tensile force) to the first wheel 208 or the second wheel 212 based on the relative movement of the mass portion 216. In particular, the secondary tensile force $F_S$ urges the first wheel 208 or the second wheel 212 to rotate about the rotation axis 206A in the secondary direction $A_{X2}$ to return to an initial wheel position, without generating any output torque of the MMR 104.

In one example according to FIG. 3A, as the mass portion 216 slides against the shaft 204 in a first linear direction (e.g., a downwards direction) 302 towards the primary body of the base exciter 202, the first inelastic string 218A generates a first tensile force and applies the first tensile force to first wheel 208. That is, the mass portion 216 or the first body 222 thereof pulls an outer radial portion the first wheel 208 to which the first inelastic string 218A is attached, thereby generating wheel torque of the first wheel 208. In this example, the first tensile force corresponds to the primary tensile force $F_P$. Accordingly, the first tensile force urges the first wheel 208 to rotate about the rotation axis 206A in the primary direction $A_{X1}$ while generating a first output torque of the MMR 104, where the first output torque is defined by a magnitude of the first tensile force and a radial distance between the rotation axis 206A and the wheel attachment point of the first inelastic string 218A. The first wheel 208 may travel across a relatively small angular distance (e.g., less than 20 degrees) to generate the first output torque before reversing direction.

In another example according to FIG. 3B, as the mass portion 216 slides against the shaft 204 in a second linear direction (e.g., an upwards direction) 304 away from the primary body of the base exciter 202, the second inelastic string 218B generates a second tensile force and applies the second tensile force to the second wheel 212. That is, the mass portion 216 or the second body 224 thereof pulls an outer radial portion the second wheel 212 to which the second inelastic string 218B is attached, thereby generating wheel torque of the second wheel 212. In this example, the second tensile force corresponds to the primary tensile force $F_P$. Accordingly, the second tensile force urges the second wheel 212 to rotate about the rotation axis 206A in the primary direction $A_{X1}$ while generating a second output torque of the MMR 104, where the second output torque is defined by a magnitude of the second tensile force and a radial distance between the rotation axis 206A and the wheel attachment point of the second inelastic string 218B. The second wheel 212 may travel across a relatively small angular distance (e.g., less than 20 degrees) to generate the second output torque before reversing direction. Due to the string architecture of the MMR 104 and/or the advantageous use of one-way bearing devices, the first and second output torques of the MMR 104 may be generated, combined, and applied to a power take-off component 102 in an alternating manner, one after the other, resulting in substantially continuous and/or reliable power generation.

The elastic strings 220 may remain in state of tension throughout these oscillation cycles, where one half-cycle of motion corresponds to a minimum and/or decreasing elastic string tension and the other half-cycle of motion corresponds to a maximum and/or increasing elastic string tension. In some examples, the first and second elastic strings 220A and 220B may be pretensioned to a certain degree prior to operation of the MMR 104. For example, when the MMR 104 is at rest or in a state of static equilibrium, the first elastic string 220A generates a third tensile force (e.g., $F_S$) and applies the third tensile force to first wheel 208, which may vary during motion rectification to act as any of a spring biasing force, a restoring force, a damping force, etc. associated with the first wheel 208. Similarly, when at rest, the second elastic string 220B may generate a fourth tensile force (e.g., $F_S$) and apply the fourth tensile force to the second wheel 212, which may vary during motion rectification to act as any of a spring biasing force, a restoring force, a damping force, etc. associated with the second wheel 212.

In some examples, as the mass portion 216 slides against the shaft 204 in the first linear direction 302, the first elastic string 220A varies (e.g., increases) the third tensile force applied to first wheel 208. That is, during the positive displacement stroke of the first wheel 208, a momentum or energy of the moving mass 216, transmitted through the first inelastic string 218A, causes the first elastic string 220A to flex, stretch, expand, and/or otherwise change states thereof to dampen or bias rotational motion of the first wheel 208 about the rotation axis 206A. In such examples, a magnitude of the third tensile force is less than a magnitude of the primary tensile force $F_P$ during the positive displacement stroke of the first wheel 208. However, when transitioning from the first half-cycle of motion to the second half-cycle of motion, tension in the first elastic string 220A becomes greater than and/or overcomes tension in the first inelastic string 218A to change the direction in which the first wheel 208 rotates about the axis 206A. As such, the momentum of the moving mass portion 216 during the first half-cycle may be split or divided between (a) driving the first wheel 208 to generate the output torque of the MMR 104 and (b) increasing the tension in the first elastic string 220A for resetting an angular position of the first wheel 208.

In another example, as the mass portion 216 slides against the shaft 204 in the second linear direction 304, the second elastic string 220B varies (e.g., increases) the fourth tensile force applied to the second wheel 212. That is, during the positive displacement stroke of the second wheel 212, a momentum or energy of the moving mass 216, transmitted through the second inelastic string 218B, causes the second elastic string 220B to flex, stretch, expand, and/or otherwise change states thereof to dampen or bias rotational motion of the second wheel 212 about the rotation axis 206A. In such examples, a magnitude of the fourth tensile force is less than a magnitude of the primary tensile force $F_P$ during the positive displacement stroke of the second wheel 212. When transitioning from the first half-cycle of motion to the second half-cycle of motion, tension in the second elastic string 220B becomes greater than and/or overcomes tension in the second inelastic string 218B to change the direction in which the second wheel 212 rotates about the axis 206A. As such, the momentum of the moving mass portion 216 during the second half-cycle may be split or divided between (a) driving the second wheel 212 to generate the output torque of the MMR 104 and (b) increasing the tension in the second elastic string 220B for resetting an angular position of the second wheel 212.

Accordingly, the mass portion 216 may undergo vertical or longitudinal displacement relative to the first wheel 208 and/or the second wheel 212, causing a change in the tension in the inelastic strings 218 and the elastic strings 220. When the mass portion 216 moves in a direction that increases tension in the first inelastic string 218A or the second inelastic string 218B, the respective string transmits the primary tensile force $F_P$ directly and without elongation to the wheel 208, 212. The force $F_P$ is delivered instantaneously and efficiently, producing a tangential component at the circumference of the wheel for rotation in the primary direction $A_{X1}$. As the wheel rotates, the resulting torque is transferred through the wheel to the axle 206 and/or the transmission system of the MMR 104.

Conversely, when the movement of the mass portion 216 shifts the load toward the first elastic string 220A or the second elastic string 220B, the respective elastic strings 220 may elongate and develop a restorative tensile force $F_S$. This force $F_S$ may act tangentially in the opposite direction, producing rotation of the wheel 208, 212 in the secondary direction $A_{X2}$ when transitions between half-cycles occur with respect to the oscillatory motion of the mass portion 216. The force $F_S$ allows the wheel 208, 212 to reposition without imposing a different counteracting torque on the axle 206 or transmission system that may adversely affect system performance.

In an embodiment, the displacement of the base exciter 202 is represented as y(t), the displacement of the mass portion 216 is represented as x(t), and the angular rotation of the wheels 208, 212 is represented as ¢ (t), and t represents time.

The displacement of the base exciter 202 represented as y(t) as a function of time (t) and may be calculated using the formula:

$$y(t)=Y\sin(\omega t)$$

where:

Y is an amplitude of the base excitation, and

ω is an angular frequency.

In an embodiment, a relative displacement (z) of the mass portion 216 as a function of time (t) may be calculated using the formula:

$$z(t)=x(t)-y(t).$$

The equation of motion for the mass portion 216 may be expressed as:

$$mz''+cz'+kz=-my':$$

where:

m is a mass of the mass portion 216, c is a damping coefficient representing a magnitude of a resistive force proportional to relative velocity of the mass portion 216, k is a spring constant of the elastic strings 220, y" is a base acceleration, and the angular rotation of the wheel as (t).

In an embodiment, the geometric relation between the relative displacement (z) of the mass portion 216 and the rotation of the wheel 208, 212 is expressed as:

$$x(t)-y(t)=r_{wheel}\phi(t),$$

where $r_{wheel}$ is a radius of the wheel 208, 212.

Figure 4:
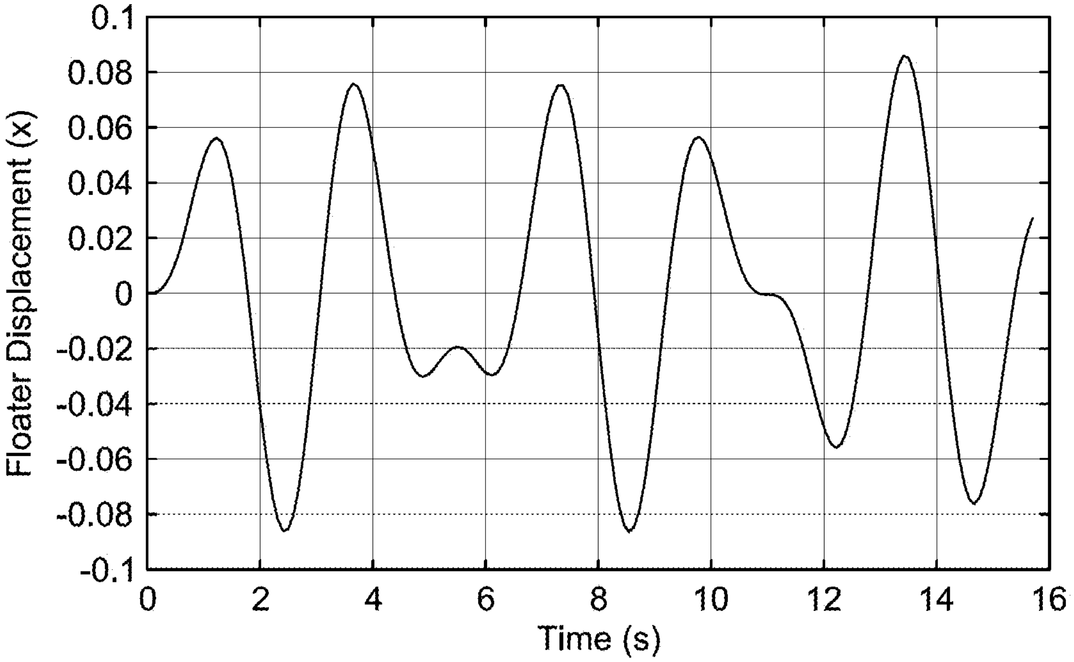
FIG. 4 is a graph showing response of the MMR to sinusoidal base excitation with respect to a floater displacement, according to certain embodiments.

Referring to FIG. 4, a graph showing a response of the MMR 104 to sinusoidal base excitation, with respect to a floater displacement, is illustrated, according to certain embodiments. The graph shows floater displacement (x) plotted on the Y-axis as a function of time(s) plotted on the X-axis. The graph validates the modeled behavior of the power take-off system 100 under sinusoidal base excitation.

Figure 5:
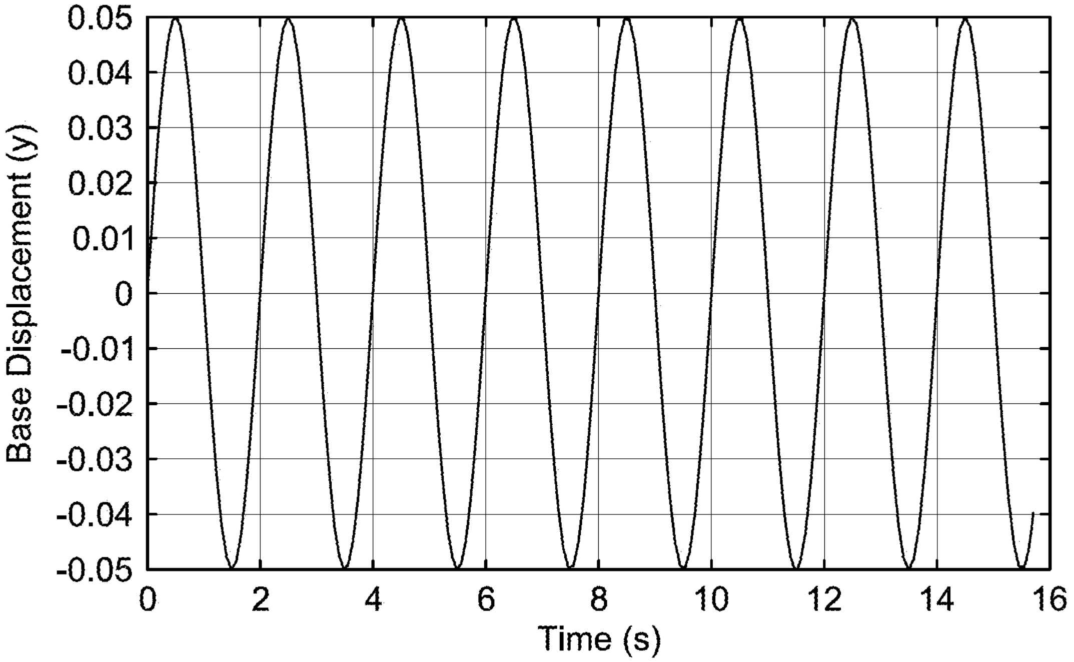
FIG. 5 is a graph showing response of the MMR to sinusoidal base excitation with respect to a base displacement, according to certain embodiments.

Referring to FIG. 5, a graph showing response of the MMR 104 to sinusoidal base excitation with respect to base displacement is illustrated. The graph shows the base displacement (y) plotted on the Y-axis as a function of time(s) plotted on the X-axis. The graph validates the modeled behavior of the power take-off system 100 under sinusoidal base excitation.

Figure 6:
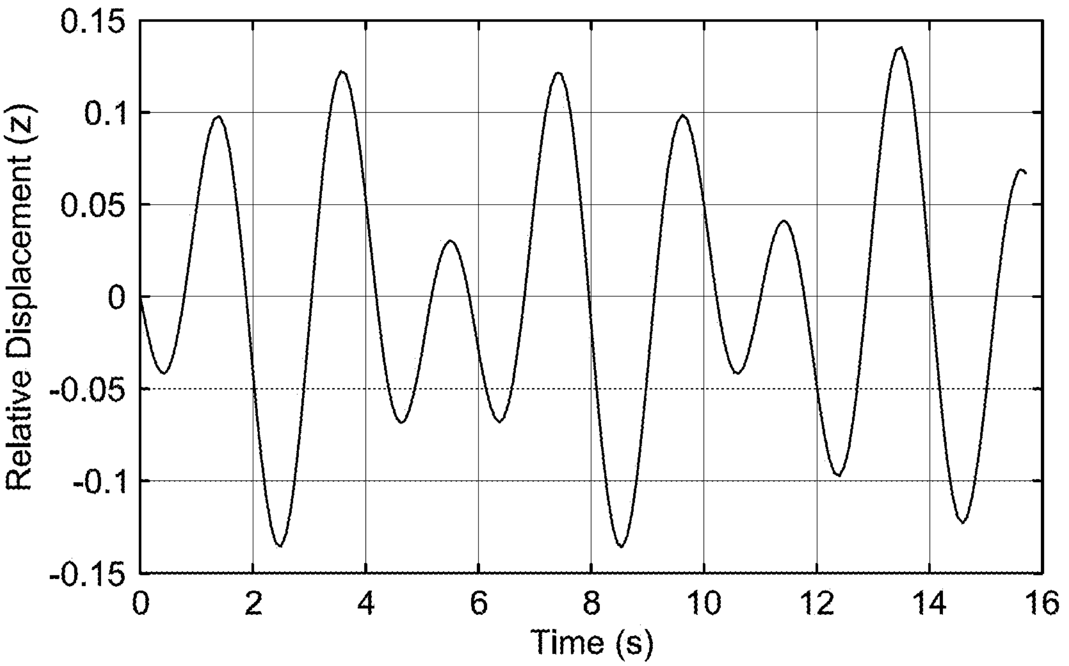
FIG. 6 is a graph showing response of the MMR to sinusoidal base excitation with respect to a relative displacement, according to certain embodiments.

Referring to FIG. 6, a graph showing response of the MMR 104 to sinusoidal base excitation with respect to relative displacement is illustrated. The graph shows relative displacement (z) plotted on the Y-axis as a function of time(s) plotted on the X-axis. The graph validates the modeled behavior of the power take-off system 100 under sinusoidal base excitation.

Figure 7:
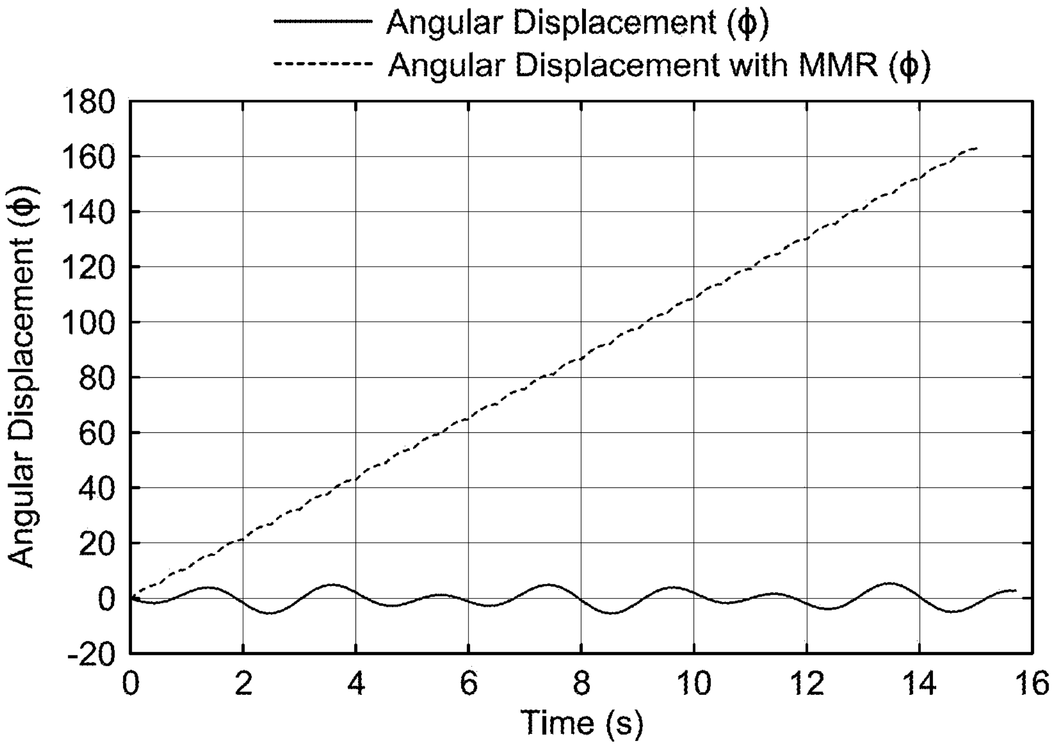
FIG. 7 is a graph showing an angular displacement response due to excitation of the base emitter, according to certain embodiments.

Referring to FIG. 7, a graph showing an angular displacement response due to excitation of the base exciter 202 is illustrated. The graph shows a comparison of the angular displacement (ϕ) of (a) a single wheel 208 or 212 and (b) the combination of both wheels 208, 212 when arranged to create the MMR 104. In some examples, an angular displacement of the first wheel 208 or the second wheel 212 is less than 20 degrees when rotating about the rotation axis 206A in the primary $A_{X1}$ or secondary direction $A_{X2}$. The rectified motion results in a monotonic angular increase over time, indicating effective unidirectional rotation of the MMR output component suitable for coupling to the electrical generator 102.

Figure 8:
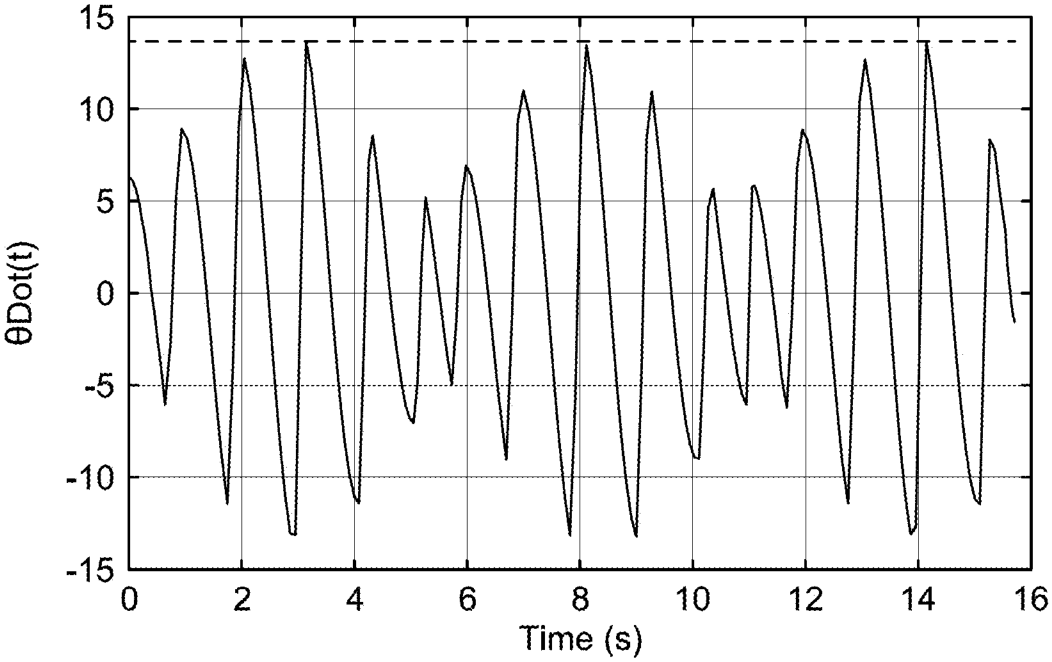
FIG. 8 is a graph showing the angular velocity reaching a minimum value in a steady state, according to certain embodiments.

Referring to FIG. 8, a graph showing the angular velocity reaching a maximum value in a steady state is illustrated. The graph shows the angular velocity ϕ(t) plotted on the Y-axis over time(s) plotted on the X-axis under base excitation. The curve shows the underlying fluctuating raw motion, and the rectified maximum velocity achievable using the MMR 104. The power take-off system 100 reaches peak velocity during precise phase alignment.

Figure 9:
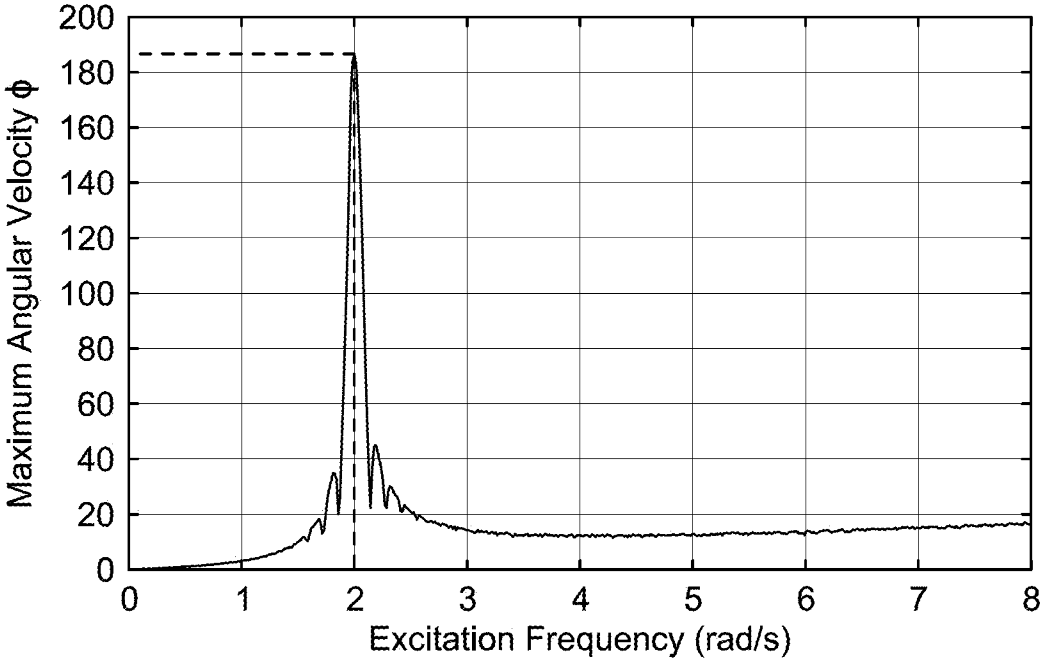
FIG. 9 is a graph showing frequency response to harmonic base excitation, according to certain embodiments.

Referring to FIG. 9, a graph showing frequency response to harmonic base excitation is illustrated. The graph shows maximum angular velocity ¢ (t) corresponding to the MMR output component plotted on the Y-axis as a function of excitation frequency (rad/s) plotted on the X-axis. The resonance peak appears at or near 2 rad/s with respect to the wave energy input to the MMR 104, showing a natural frequency where maximum energy harvesting occurs in the MMR 104. That is, when wave or excitation frequency is the same or substantially equal to the natural frequency of the MMR 104, wheel velocity and/or the output of the MMR 104 reach relative maximums. In particular, the MMR 104 is dynamically tunable by adjusting the mass of the mass portion 216 and/or the spring constants of the elastic strings 220, thereby changing the natural frequency of the MMR 104 in a predictable manner suitable for a desired application. In one example, the MMR 104 is configured to have a natural frequency that is predefined to be between 1 rad/s and 3 rad/s.

In an embodiment, the MMR 104 of the power take-off system 100 includes the base exciter 202, which may be cuboid-shaped, serving as the main structural and foundational component of the MMR 104.

In an embodiment, the shaft 204 is fixedly coupled to the base exciter 202. The shaft 204 may be used as a guide for a mass 'm' that may move concentrically along the vertical axis-performing vertical oscillations.

In an embodiment, the axle 206 defines the rotation axis 206A. The axle 206 is supported by the shaft 204 and may be connectable to the electrical generator 102. As the axle 206 rotates, torque may be transferred directly through or around the shaft 204, ensuring synchronized movement between connected components. This configuration provides stable power transmission, supports precise motion control, and enables efficient operation of the mechanical systems linked to the axle 206.

In an embodiment, the axle 206 is oriented perpendicular to the shaft 204. The perpendicular arrangement facilitates efficient mechanical interaction between rotating components and linearly moving elements. The arrangement ensures stability, reliable force transmission, and/or a spatial configuration suitable for the intended operational requirements. The arrangement further enables the wheels 208, 212 mounted on the axle 206 to operate properly relative to the vertical movement permitted by the shaft 204.

In an embodiment, the first wheel 208 is rotatably coupled to the axle 206 via the first bearing 210. The second wheel 212 is rotatably coupled to the axle 206 via the second bearing 214. Each of the first wheel 208 and the second wheel 212 is configured to partially rotate about the rotation axis 206A in a primary direction $A_{X1}$ together with the axle 206 during positive-displacement wheel strokes and (2) a secondary direction $A_{X2}$, opposite to the primary direction $A_{X1}$, independent of the axle 206 during return-displacement wheel strokes.

In an embodiment, the bearings 210, 214 are configured to facilitate smooth rotational movement of the first wheel 208 and the second wheel 212 about the axle 206, thereby reducing friction and wear. The arrangement provides reliable operation and mechanical stability, which enhances the efficiency and service life of the MMR 104.

In an embodiment, during positive-displacement wheel strokes, both the first wheel 208 and the second wheel 212 rotate together with the axle 206 in the primary direction $A_{X1}$, transmitting torque and motion required for the operational cycle of the MMR 104. This coordinated motion with the axle 206 is advantageous for driving mechanical loads or propagating the movement of the MMR 104.

In an embodiment, during return-displacement of the strokes of the wheels 208, 212, each of the first wheel 208 and the second wheel 212 rotates in the secondary direction $A_{X2}$, opposite to the primary direction $A_{X1}$, independently of the axle 206. The axle 206 may remain stationary or move differently, each wheel 208, 212 reverse rotation without direct torque coupling to the axle 206, for the wheels 208, 212 to reset or repositioning for subsequent operation cycles.

In an embodiment, the one-way bearing is configured to permit rotational movement in only one direction while preventing rotation in the opposite direction to allow torque transfer through the bearing.

In an embodiment, the shaft 204 is positioned between the first wheel 208 and the second wheel 212. The central positioning of the shaft 204 facilitates balanced load distribution and promotes mechanical symmetry. The arrangement further supports coordinated operation of both the wheels 208, 212, enabling stable and efficient transmission of forces and motion within the MMR 104.

In an embodiment, the inelastic strings 218 operatively couple the mass portion 216 to the first wheel 208 and the second wheel 212. The inelastic strings 218 may be configured to transmit mechanical forces or displacement between the mass portion 216 and the wheels 208, 212 without substantial elongation or energy loss due to stretching. The rigid coupling provides precise and consistent transfer of motion, thereby allowing movement of the mass portion 216 along the shaft 204 to directly influence the rotational behavior of the wheels 208, 212, and vice versa.

In an embodiment, the elastic strings 220 operatively couple the mass portion 216 to the first wheel 208 and the second wheel 212. The elastic strings 220 may be designed to stretch and contract in response to movements of the mass portion 216 or the wheels 208, 212, thereby enabling the transmission of adjustable forces and allowing for controlled relative displacement among the connected components.

In an embodiment, the first body 222 defines the first end of the mass portion 216. The first body 222 is attached to a first inelastic string 218A and a first elastic string 220A that are routed from the first body 222 to the first wheel 208. The first inelastic string 218A provides a rigid transmission path for force and positional changes, and the first elastic string 220A introduces controlled flexibility. Together, these connections enable balanced mechanical responsiveness and improved functional control of the mass portion 216.

In an embodiment, the second body 224 is spaced apart from the first body 222 that defines the second end of the mass portion 216 opposite to the first end. The second body 224 is attached to a second inelastic string 218B and a second elastic string 220B that are routed from the second body 224 to the second wheel 212. The second inelastic string 218B provides a rigid transmission path for force and positional changes, and the second elastic string 220B introduces controlled flexibility.

In an embodiment, each of the first body 222 and the second body 224 of the mass portion 216 includes a disc 226A, 226B which is concentric with the shaft 204. Further, each of the first body 222 and the second body 224 may include a string attachment mechanism 228A, 228B disposed on an inner side of the disc 226A,226B facing the axle 206. This string attachment mechanism 228A, 228B facilitates the secure attachment of inelastic strings 218 and the elastic strings 220 to the first body 222 and the second body 224.

In an embodiment, the intermediate body 230 is coupling the first body 222 to the second body 224. The intermediate body 230 may function as the central structural connector configured to maintain precise alignment and spacing between the two end bodies of the mass portion 216, thereby contributing to overall rigidity and structural integrity. The intermediate body 230 enables effective distribution of mechanical loads and supports attachments routed between the first body 222 and the second body 224. This configuration facilitates reliable force transmission and coordinates movement within the mass portion 216.

In an embodiment, the first wall 232A extends vertically between the first body 222 and the second body 224 of the mass portion 216 and is parallel to the shaft 204. The parallel orientation of the first wall 232A relative to the shaft 204 is configured to promote uniform load transfer, facilitating assembly, and ensuring reliable guidance of relative motion.

In an embodiment, each of the inelastic strings 218 is configured to apply a primary tensile force $F_P$ to the first wheel 208 or the second wheel 212 based on the relative movement of the mass portion 216. The primary tensile force $F_P$ urges the first wheel 208 or the second wheel 212 to rotate about the rotation axis 206A in the primary direction $A_{X1}$ while generating an output torque applied to the axle 206.

In an embodiment, each of the elastic strings 220 is configured to apply a secondary tensile force $F_S$ to the first wheel 208 or the second wheel 212 based on the relative movement of the mass portion 216 The secondary tensile force $F_S$ urges the first wheel 208 or the second wheel 212 to rotate about the rotation axis 206A in the secondary direction $A_{X2}$.

In an embodiment, the at least one abutment surface 234 defines the aperture 236 centrally disposed on the mass portion 216 in which the shaft 204 is inserted. The aperture 236 provides a passageway for the shaft 204 to be securely inserted. The central disposition of the aperture 236 contributes to balanced load distribution and supports reliable mechanical engagement, facilitating proper function within the MMR 104.

In an embodiment, the at least one abutment surface 234 is configured to slide against the shaft 204 to guide movement of the mass portion 216 concentrically along the shaft 204. The at least one abutment surface 234 may stabilize the interface between the mass portion 216 and the shaft 204, ensuring controlled longitudinal movement and precise positioning of the mass portion 216.

In an embodiment, the second wall 232B extends vertically between the first body 222 and the second body 224 of the mass portion 216 parallel to the shaft 204. The parallel orientation of the first wall 232A relative to the shaft 204 is configured to promote uniform load transfer, facilitating assembly, and ensuring reliable guidance of relative motion.

In an embodiment, the shaft 204 is centrally positioned between the first wall 232A and the second wall 232B. The positioning of the shaft 204 establishes a symmetrical arrangement within the mass portion 216, enhancing structural balance and load distribution, ensuring stable support and accurate alignment of moving components.

In an embodiment, the first wheel 208, the second wheel 212, the inelastic strings 218, and the elastic strings 220, together, are configured to rectify both half-cycles of linear oscillatory motion of the mass portion 216 such that the wheel output torque causes the axle 206 to rotate continuously in the primary direction $A_{X1}$.

In an embodiment, the MMR 104 operates as a full-wave mechanical rectifier, converting bidirectional linear input motion into unidirectional rotational output. During the positive-displacement half-cycle, the mass portion 216 moves linearly in a manner that increases tension in at least one of the inelastic strings 218 while decreasing tension in a different one of the inelastic strings 218. During the negative-displacement stroke, the mass portion 216 moves in the reverse linear direction.

In an embodiment, the angular displacement of the first wheel 208 or the second wheel is less than 20 degrees when rotating about the rotation axis 206A in the primary $A_{X1}$ or the secondary direction $A_{X2}$.

It will be appreciated that the systems, apparatus, articles of manufacture, and related methods disclosed in the foregoing description provide numerous advantages. Examples disclosed herein provide a string-based MMR device employing a dual-wheel architecture including a movable, suspended mass portion that drives wheel motion of the MMR in response to sinusoidal excitation of a base exciter, which can rectify full-cycles of linear oscillatory motion resulting from the excitation. The MMR device utilizes an advantageous combination inelastic and elastic string members to create connections between the mass portion and the wheels that control wheel motion via string tension that may vary throughout wheel movement cycles, providing a mass-spring-damper system having a natural frequency that is tunable depending on the application, such that energy conversion efficiencies peak at a target input frequency. Examples disclosed herein enable the harvesting of kinetic energy and efficient conversion thereof into electrical energy in both half-cycles of system excitation. Examples disclosed herein significantly improve MMR conversion efficiency compared to conventional devices. Examples disclosed herein reduce overall system mass by eliminating redundant and/or mechanically complex power-conversion components and enable scalable deployment across diverse wave energy applications.

Although certain example systems, apparatus, articles of manufacture, and related methods have been disclosed herein, the scope of coverage of this patent is not limited thereto. Obviously, numerous modifications and variations of the present disclosure are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public

The invention claimed is:

1. A mechanical motion rectifier for use with a power take-off system, comprising:

a base exciter including a vertical shaft fixedly coupled thereto;

an axle defining a rotation axis, the axle supported by the vertical shaft and connectable to a power take-off component;

a first wheel rotatably coupled to the axle via a first bearing;

a second wheel rotatably coupled to the axle via a second bearing, each of the first wheel and second wheel configured to partially rotate about the rotation axis (1) in a primary direction together with the axle during positive-displacement wheel strokes and (2) a secondary direction, opposite to the primary direction, independent of the axle during return-displacement wheel strokes;

a mass portion through which the vertical shaft extends that is movable along the vertical shaft relative to the axle;

inelastic strings operatively coupling the mass portion to the first wheel and the second wheel, each of the inelastic strings configured to apply a primary tensile force to the first or second wheel based on relative movement of the mass portion, the primary tensile force urging the first or second wheel to rotate about the rotation axis in the primary direction while generating an output torque applied to the axle; and elastic strings operatively coupling the mass portion to the first wheel and the second wheel, each of the elastic strings configured to apply a secondary tensile force to the first wheel or second wheel based on the relative movement of the mass portion, the secondary tensile force urging the first wheel or second wheel to rotate about the rotation axis in the secondary direction, wherein, the first wheel, the second wheel, the inelastic strings, and the elastic strings, together, are configured to rectify both half-cycles of linear oscillatory motion of the mass portion such that the output torque causes the axle to rotate continuously in the primary direction.

2. The mechanical motion rectifier of claim 1, wherein each of the first bearing and the second bearing includes a one-way bearing.

3. The mechanical motion rectifier of claim 1, wherein the mass portion includes at least one abutment surface defining an aperture centrally disposed on the mass portion in which the vertical shaft is inserted, the abutment surface configured to slide against the vertical shaft to guide movement of the mass portion concentrically along the vertical shaft.

4. The mechanical motion rectifier of claim 1, wherein the axle is oriented perpendicular to the vertical shaft.

5. The mechanical motion rectifier of claim 1, wherein the vertical shaft is positioned between the first wheel and the second wheel.

6. The mechanical motion rectifier of claim 1, wherein the mass portion includes:

a first body defining a first end of the mass portion, the first body attached to a first inelastic string and a first elastic string that are routed from the first body to the first wheel, a second body spaced apart from the first body that defines a second end of the mass portion opposite to the first end, the second body attached to a second inelastic string and a second elastic string that are routed from the second body to the second wheel, and an intermediate body coupling the first body to the second body.

7. The mechanical motion rectifier of claim 6, wherein each of the first body and the second body of the mass portion includes a disc concentric with the vertical shaft and a string attachment mechanism disposed on an inner side of the disc facing the axle.

8. The mechanical motion rectifier of claim 6, wherein the intermediate body of the mass portion includes a first wall extending vertically between the first body and the second body of the mass portion parallel to the vertical shaft.

9. The mechanical motion rectifier of claim 8, wherein the intermediate body of the mass portion includes a second wall extending vertically between the first body and the second body of the mass portion parallel to the vertical shaft, the vertical shaft centrally positioned between the first wall and second wall.

10. The mechanical motion rectifier of claim 6, wherein the axle is positioned between the first body and the second body of the mass portion.

11. A power take-off system, comprising;

an electrical generator; and a mechanical motion rectifier (MMR) operatively coupled to the electrical generator that is configured to receive a wave energy, the MMR including:

a base exciter including a vertical shaft fixedly coupled thereto, an axle defining a rotation axis, the axle supported by the vertical shaft and connected to the electrical generator, a first wheel rotatably coupled to the axle via a first bearing, a second wheel rotatably coupled to the axle via a second bearing, each of the first wheel and the second wheel configured to partially rotate about the rotation axis (1) in a primary direction together with the axle during positive-displacement wheel strokes and (2) a secondary direction, opposite to the primary direction, independent of the axle during return-displacement wheel strokes, a mass portion through which the vertical shaft extends that is movable along the vertical shaft relative to the axle, inelastic strings operatively coupling the mass portion to the first wheel and the second wheel, each of the inelastic strings configured to apply a primary tensile force to the first wheel or the second wheel based on relative movement of the mass portion, the primary tensile force urging the first wheel or second wheel to rotate about the rotation axis in the primary direction while generating an output torque applied to the axle, and elastic strings operatively coupling the mass portion to the first wheel and the second wheel, each of the elastic strings configured to apply a secondary tensile force to the first wheel or second wheel based on the relative movement of the mass portion, the secondary tensile force urging the first wheel or second wheel to rotate about the rotation axis in the secondary direction, wherein, the first wheel, the second wheel, the inelastic strings, and the elastic strings, together, are configured to rectify both half-cycles of linear oscillatory motion of the mass portion such that the output torque causes the axle to rotate continuously in the primary direction.

12. The power take-off system of claim 11, wherein each of the first bearing and the second bearing includes a one-way bearing.

13. The power take-off system of claim 11, wherein the mass portion includes at least one abutment surface defining an aperture centrally disposed on the mass portion in which the vertical shaft is inserted, the abutment surface configured to slide against the vertical shaft to guide movement of the mass portion concentrically along the vertical shaft.

14. The power take-off system of claim 11, wherein the axle is oriented perpendicular to the vertical shaft.

15. The power take-off system of claim 11, wherein the vertical shaft is positioned between the first wheel and the second wheel.

16. The power take-off system of claim 11, wherein the mass portion includes:

a first body defining a first end of the mass portion, the first body attached to a first inelastic string and a first elastic string that are routed from the first body to the first wheel, a second body spaced apart from the first body that defines a second end of the mass portion opposite to the first end, the second body attached to a second inelastic string and a second elastic string that are routed from the second body to the second wheel, and an intermediate body coupling the first body to the second body.

17. The power take-off system of claim 16, wherein each of the first body and the second body of the mass portion includes a disc concentric with the vertical shaft and a string attachment mechanism disposed on an inner side of the disc facing the axle.

18. The power take-off system of claim 16, wherein the intermediate body of the mass portion includes a first wall extending vertically between the first body and the second body of the mass portion parallel to the vertical shaft.

* * * * *